April 8, 1947.  D. M. PALM  2,418,661
INDUSTRIAL TRUCK
Filed Jan. 19, 1946  2 Sheets-Sheet 1

INVENTOR.
Dwight M. Palm,
BY Hull & West,
ATTORNEYS

April 8, 1947.  D. M. PALM  2,418,661

INDUSTRIAL TRUCK

Filed Jan. 19, 1946  2 Sheets-Sheet 2

INVENTOR.
Dwight M. Palm
BY
Hull & Waite
ATTORNEYS

Patented Apr. 8, 1947

2,418,661

UNITED STATES PATENT OFFICE 2,418,661

INDUSTRIAL TRUCK

Dwight M. Palm, Cleveland Heights, Ohio, assignor to Towmotor Corporation, Cleveland, Ohio, a corporation of Ohio Application January 19, 1946, Serial No. 642,223

16 Claims. (Cl. 214—113)

This invention relates to load handling apparatus, and more particularly to means for discharging from a load supporting member or members of an industrial truck any objects which may be supported thereby. It has for its general object to enable articles that may be mounted upon the forks or supporting platform of such trucks to be removed therefrom by power-operated pushing members.

A more limited object of the invention is to provide an operating mechanism for such pushing members which is simple in construction and efficient in operation and the operating parts of which will not interfere with the accessibility of the operator to his operating station or platform.

A still further object of the invention is to provide, for trucks of standard construction, pusher-operating mechanisms the major elements of which can be assembled and thereafter installed as assembled units upon such trucks.

Figure 1:
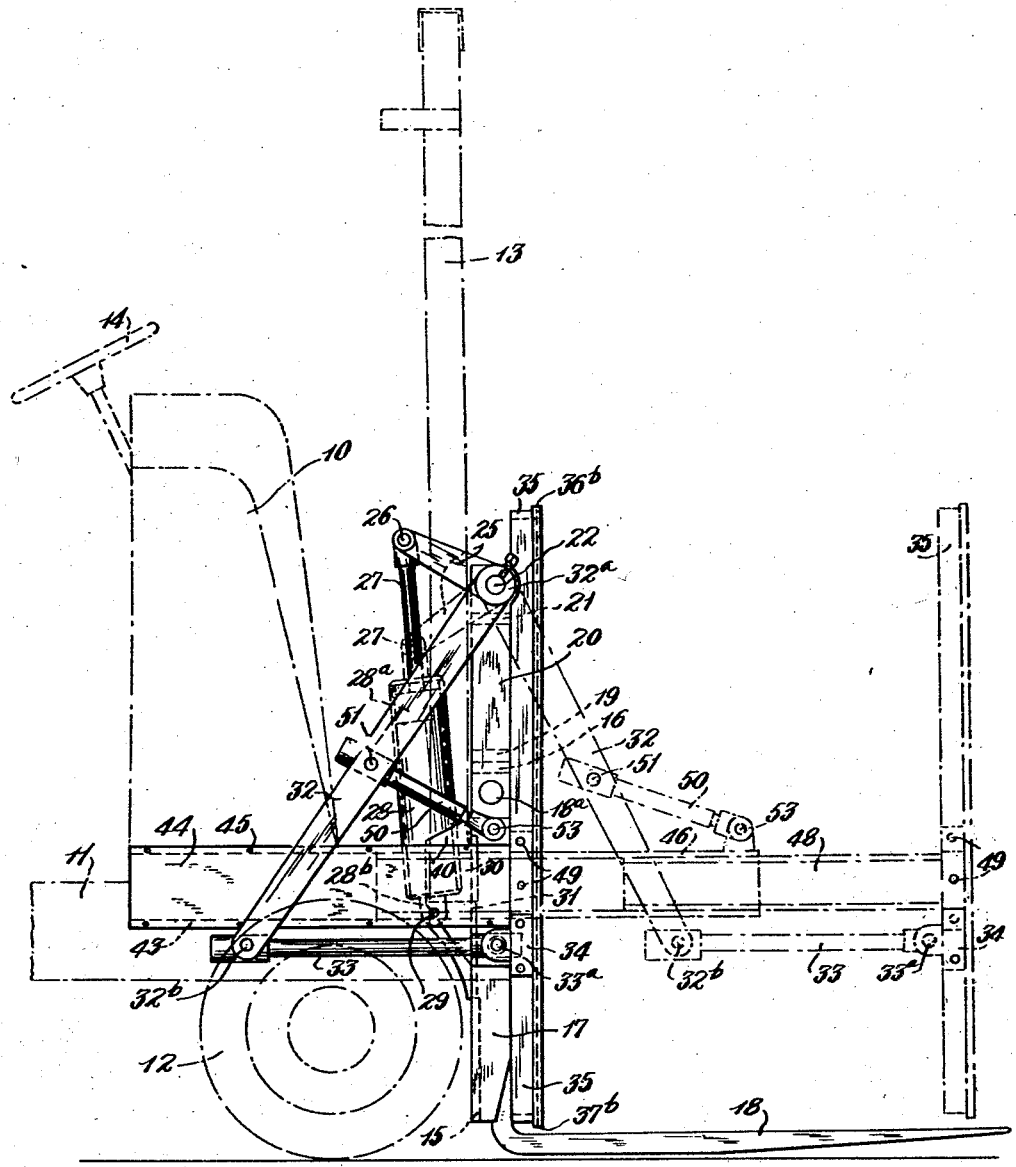
Figure 2:
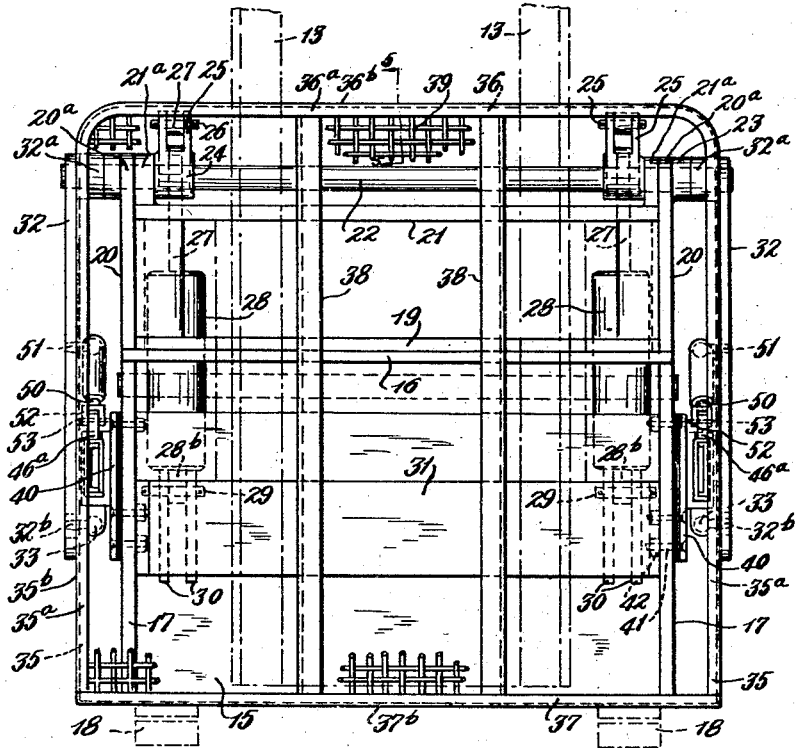
Figure 5:
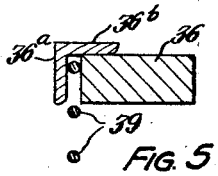
Figure 3:
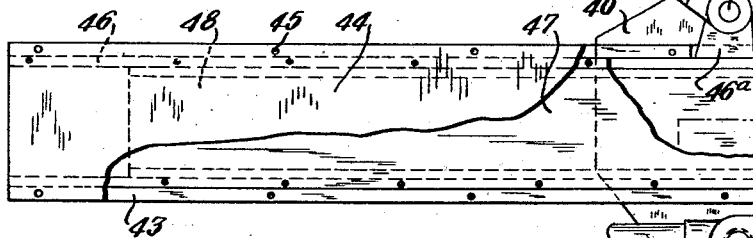
Figure 4:
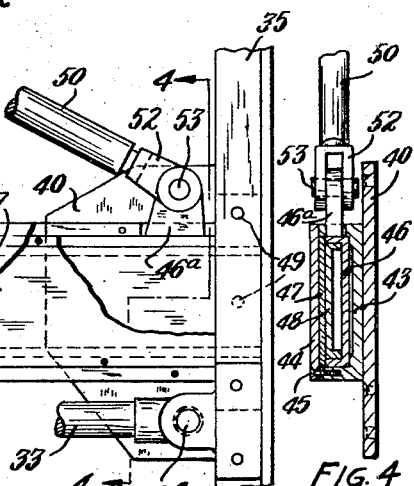

Further and more limited objects of the invention will be set forth at greater length hereinafter and will be realized in and through the construction and arrangement of parts shown in the drawings hereof, wherein Fig. 1 represents in broken lines a side elevational view of the front portion of an industrial truck equipped with a pushing member and with operating mechanism therefor constructed in accordance with my invention; Fig. 2 a front elevational view of the parts shown in Fig. 1; Fig. 3 a sectional elevational view of the telescoping members by which one side of the pushing member is operated, together with portions of the elements by which the telescoping members are operated; Fig. 4 a detail in section corresponding to the line 4—4 of Fig. 3 and looking in the direction of the arrows; and Fig. 5 a detail in section taken on the line 5—5 of Fig. 2.

Describing by reference characters the various parts shown herein, 10 denotes the hood, 11 one of the side members, 12 one of the front wheels, 13 the side members of the mast, and 14 the steering wheel of an industrial truck of well known construction, the aforesaid parts being shown in broken lines. 15 denotes the bottom transverse plate, 16 the top, and 17 the sides of a standard carriage which is mounted for vertical movement along the mast members 13, the carriage being shown as provided with a load support, such as forks 18, secured thereto in any approved standard manner as by a shaft $18^a$ extending through the upper ends thereof and being supported by the sides 17 of the carriage.

The carriage is intended to be operated in the usual manner for vertical movement along the mast members 13 through any well-known elevating and lowering means (not illustrated).

Secured upon the top member 16 of the carriage is a vertical extension thereof, the said extension having a bottom member 19 secured on top of the top member 16 of the carriage and being provided with side members 20 constituting extensions of the side members of the said carriage and with a top cross member 21 connecting the side members 20 below the tops thereof. The extensions $20^a$ of the side members 20 are provided with openings for the reception of the journal portions of a rock shaft 22, there being bearing bosses $21^a$ and 23 for the said journal portions carried by the ends of the cross member 21 and by the upper ends of the side members 20.

Secured to the shaft 22 adjacent to and within the bearing bosses $21^a$ are hubs 24, each provided with forks 25 constituting lever arms which support journal pins 26 at their outer ends to which pins the upper ends of piston rods 27 are connected, the said piston rods having each a piston $28^a$ at its lower end mounted in a cylinder 28, each cylinder being pivotally supported by a center lug $28^b$ pivotally connected by a pin 29 to and between the rear ends of brackets 30 secured to a plate 31 extending transversely of the main carriage and connected to the side members 17 thereof.

32 denotes lever arms rigidly connected at their upper ends to opposite ends of the shaft 22 by means of hubs $32^a$ and each pivotally connected at its lower end at $32^b$ to the rear end of a pusher bar 33, the front of which is pivotally connected at $33^a$ to the rear lug of a bracket 34 fastened to the appropriate side member 35 of a load-pusher, said pusher comprising the side members 35 which form part of a frame including a top member 36 and a bottom member 37. Vertical bracing members 38 connect the top and bottom members 36 and 37, and the aforesaid frame and bracing members may, where desirable or necessary, support a heavy wire-mesh load-engaging surface, in which case the edges of the wire mesh may be clamped against the top, side and bottom members by means of angle irons $35^a$, $35^b$, $36^a$, $36^b$, $37^a$ and $37^b$, respectively, which angle irons may be secured in place as by welding. Part of such wire mesh surface is indicated at 39, the remaining portion of the surface being omitted for the purpose of clearness of illustration of the parts therebehind.

The load pushing member is of considerably greater width than the width of the frame of the truck and the width of the carriage, whereby the lever arms 32 and the pusher bars 33 may be located exteriorly of the front of the truck. It will be evident that, by supplying pressure fluid to the upper ends of the cylinders 28, the shaft 22 will be rocked, thereby to cause the pusher bars 33 to move the load pusher forwardly above the forks 18. In order to support the load-pushing member as well as to maintain the same against rocking movement about an axis extending transversely thereof while being moved toward and from the mast, I have provided the following construction:

40 denotes bracket plates which are secured to the side members of the carriage by bolts 41 and nuts 42. 43 denotes channeled guiding and supporting members the base or web of each of which is secured to the appropriate bracket plate 40 and extends rearwardly and horizontally therefrom, being shown as extending substantially as far as the rear of the hood 10. Each guiding and supporting member is provided with a cover 44 secured to the flanges thereof as by screws 45. Slidably mounted and closely fitted within the channeled guiding and supporting members 43, 44 are intermediate channeled guiding and supporting members 46 provided each with a cover 47 secured to the flanges thereof. Slidably mounted and closely fitted within each of these intermediate channeled members is a third channeled member 48, the outer end of each of the members 48 being rigidly connected to the appropriate side member 35 of the load pusher frame by bolts 49.

50 denotes pusher arms each of which is pivotally connected at its rear or outer end, as shown at 51, to the appropriate arm 32 and at its front or inner end being provided with forks 52 for the reception of a pin 53, extending through said forks and through a lug 46ª extending upwardly from and connected to the top of the intermediate channel member 46, 47. It will be noted that the outer end of each of the arms 50 is connected to an arm 32, preferably midway of the length of the latter.

With the parts constructed and arranged as described, and assuming that the load-pushing member is in its retracted position wherein it may bear against the front of the carriage and the vertical extension thereof and also assuming that there is a load upon the forks 18 which it is desired to disengage therefrom, pressure fluid is supplied to the tops of the cylinders 28 by suitable hose connections (not shown) thereby pulling the outer ends of the lever arms 25 downwardly and rocking the shaft 22 in a direction to cause the lower ends of the arms 32 to move the pusher bars 33 and the load pushing member forwardly. As the load pushing member moves forwardly, the channel members 48 will move therewith in a direction at substantially right angles to the sides of the carriage but will be maintained in such direction of movement as well as against movement about a horizontal axis by the intermediate channeled guiding and supporting members 46, 47, which also move forwardly substantially half the distance that the members 48 are moved, whereby the latter members are supported against movement about a horizontal axis, the rear or inner ends of the intermediate guiding and supporting members 46, 47 being in turn supported for movement in a direction at substantially right angles to the sides of the carriage and against movement about a horizontal axis by the channeled members 43 and their covers 44. The positions which the parts assume at the end of a full stroke of the load pusher are shown in broken lines in Fig. 1. The load pusher and the parts connected thereto and movable therewith can be returned to the position shown in full lines by supplying pressure fluid to the bottoms of the cylinders 28 through suitable hose connections (not shown).

Among the advantages of my invention are the following:

With the exception of the members 43, 44, 46, 47 and 48 and the operating pistons and cylinders, the pusher-operating mechanism can be assembled, and applied thereafter, as a unit to the rear of a carriage such as forms part of the standard equipment of certain type of industrial trucks.

If, for any reason, it should be desirable to remove the load pusher and its mechanism, this removal can be quickly and conveniently effected.

Where the forks or other load carrying members art not of unusual length, the operating parts for the load pushing member will all be located in front of the operator's entrance to the truck.

The load pushing member will be maintained against sagging toward the forks or platform during the movements toward and from the carriage.

The entire mechanism may be applied to existing types of trucks without alteration of the operating parts thereof and merely by the addition to such trucks of the elements which constitute the said mechanism.

The entire mechanism can be constructed and incorporated in a truck of standard construction at a comparatively small expense.

Having thus described my invention, what I claim is:

1. In an industrial truck having a frame, a mast and a carriage supported for vertical movements by and along said mast; a load pushing member supported by and movable with said carriage and means for moving the same forwardly and rearwardly with respect to said carriage, said means comprising pusher bars pivotally connected at their front ends to opposite side portions of said load-pushing member, power operated means also supported by said carriage and pivotally connected to the rear ends of said pusher bars, for moving the latter simultaneously forwardly and rearwardly, supporting members connected to opposite side portions of said load pushing member and movable therewith, means mounted on the carriage and slidably restraining the said supporting members against vertical movement during the movements of the load pushing member toward and from the carriage by said pusher bars, and a load support secured to and extending forwardly from said carriage beneath the bottom of said load pushing member.

2. In an industrial truck having a frame, a mast and a carriage supported for vertical movements by and along said mast; a load-pushing member supported by and movable with said carriage and means for reciprocating the same with respect to said carriage, the said means comprising a rock shaft extending transversely of and supported by said carriage, power operated means also supported by said carriage for operating said rock shaft, arms secured to opposite end portions of said rock shaft and extending downwardly therefrom, pusher bars pivotally connected at their rear ends to the lower portions of said arms, pivotal connections between the front ends of said bars and the respective side portions of the load-pushing member, supporting members connected to opposite side portions of said load-pushing member and movable therewith, and means supported by the opposite side portions of the carriage and slidably restraining the supporting members against vertical and sidewise movement during the movements of the load-pushing member toward and from the carriage.

3. In an industrial truck having a frame, a mast and a carriage supported for vertical movements by and along said mast; a load-pushing member and means for reciprocating the same with respect to said carriage, the said means comprising a rock shaft extending transversely of and supported by said carriage, power operated means also supported by said carriage for operating said rock shaft, arms secured to opposite end portions of said rock shaft and extending downwardly therefrom, pusher bars pivotally connected at their rear ends to the lower portions of said arms, pivotal connections between the front ends of said bars and the respective side portions of the load pushing member, longitudinally extending guiding and supporting members secured to opposite sides of said carriage and extending rearwardly therefrom, longitudinally extensible members slidably supported by said guiding and supporting members and connected to opposite side portions of said load-pushing member for restraining the latter against vertical movements while being operated by said pusher bars and a load support secured to and extending forwardly from said carriage beneath the bottom of said load-pushing member.

4. In an industrial truck having a frame, a mast and a carriage supported for vertical movements by and along said mast; a load-pushing member and means for reciprocating the same with respect to said carriage, the said means comprising a rock shaft extending transversely of and supported by said carriage, power operated means also supported by said carriage for operating said rock shaft, arms secured to opposite end portions of said rock shaft and extending downwardly therefrom, pusher bars pivotally connected at their rear ends to the lower portions of said arms, pivotal connections between the front ends of said bars and opposite side portions of said load-pushing member, longitudinally extending supports secured to and extending rearwardly from opposite side portions of said carriage, intermediate longitudinally extending supporting members reciprocably supported by said supports, longitudinally extending supporting members slidably supported by said intermediate supporting members and connected at their front ends to opposite side portions of said pushing member, and means for moving the intermediate supporting members along their supports thereby to sustain the longitudinally extending supporting members as they are being moved, together with the load-pushing member, by the said pusher bars.

5. In the industrial truck set forth in claim 4, the means for moving the intermediate supporting members comprising pusher arms connected to the first-mentioned arms intermediately of the ends thereof.

6. In the industrial truck set forth in claim 4 a load support secured to and extending forwardly from the carriage beneath the bottom of the load-pushing member.

7. An industrial truck having a frame, a mast and a carriage supported for vertical movements by and along said mast; a load-pushing member and means for reciprocating the same with respect to said carriage, said means comprising a rock shaft extending transversely of and supported by said carriage, power means also supported by said carriage for operating said rock shaft, arms secured to opposite end portions of said rock shaft and extending downwardly therefrom, pusher bars pivotally connected at their rear ends to the lower portions of said arms and pivotal connections between the front ends of said bars and opposite side portions of said load-pushing member, longitudinally extending guiding and supporting members secured to and extending rearwardly from side portions of said carriage, an intermediate guiding and supporting member slidably supported by each of the first mentioned guiding and supporting members and means pivotally connecting intermediate portions of said arms with the said intermediate guiding and supporting members, and supporting members slidably supported by each of the last mentioned members and connected at their front ends to opposite side portions of the load-pushing member whereby, when the load-pushing member is moved forwardly by the operation of the rock shaft, the intermediate guiding and supporting members will also be moved forwardly with their rear portions supported by the first mentioned guiding and supporting members while their front portions support the rear portions of the third mentioned supporting members when the load-pushing member is at the extreme end of its forward movement.

8. In the industrial truck set forth in claim 7, a load support secured to and extending forwardly from the carriage beneath the bottom of the load-pushing member.

9. In an industrial truck having a frame, a mast and a carriage supported for vertical movements by and along said mast; a load-pushing member and means for reciprocating the same with respect to said carriage, said means comprising a rock shaft extending transversely of and supported by said carriage, power means also supported by said carriage for operating said rock shaft, arms secured to opposite end portions of said rock shaft and extending downwardly therefrom, pusher bars pivotally connected at their rear ends to the lower portions of said arms and pivotal connections between the front ends of said bars and opposite side portions of said load-pushing member, and means for supporting the said load-pushing member against vertical movement while being moved toward and from the said carriage by the said arms and the said pusher bars, the said supporting means comprising guiding and supporting members secured to opposite side portions of said carriage and extending rearwardly therefrom, intermediate guiding and supporting members slidably supported by the first mentioned guiding and supporting members, and cooperating supporting members slidably supported by the intermediate guiding and supporting members, the said supporting members being secured at their outer ends to opposite side portions of said load-pushing member, the said intermediate guiding and supporting members being of such length that, when the load-pushing member is in its extreme forward position, the rear ends of the supporting members connected thereto will be supported by the front portions of the intermediate guiding and supporting members and the rear portions of the latter members will be supported by the forward portions of the first mentioned guiding and supporting members, and means for imparting to the intermediate guiding and supporting members movements of less extent than are imparted to the load-pushing member by the pusher bars.

10. In the industrial truck set forth in claim 9, a load support secured to and extending forwardly from the carriage beneath the bottom of the load-pushing member.

11. In the industrial truck set forth in claim 9, the first mentioned guiding and supporting members comprising each a channel secured to a side portion of the carriage and each intermediate guiding and supporting member also comprising a channel slidably mounted within a first mentioned channel, and the members which are slidably mounted within the intermediate guiding and supporting members being also channels, and a load-supporting member secured to and extending forwardly from the carriage beneath the bottom of the load-pushing member.

12. In the industrial truck set forth in claim 9, the means for imparting movements to the intermediate guiding and supporting members comprising pusher arms pivotally connected at their rear ends to the first mentioned arms intermediately of the ends of the latter and pivotally connected at their front ends to said intermediate guiding and supporting members.

13. In the industrial truck set forth in claim 2, the power means for operating the rock shaft comprising lever arms secured to and rigid with the said rock shaft; cylinders pivotally supported each at one end from said carriage, pistons within said cylinders, and piston rods for said cylinders having their outer ends pivotally connected to the outer ends of the said lever arms.

14. In the industrial truck set forth in claim 2, the power means for operating the rock shaft comprising lever arms secured to and rigid with the said rock shaft, the said lever arms being spaced inwardly from the first mentioned arms, brackets secured to side portions of the carriage, cylinders pivotally supported at their lower ends by said brackets, pistons within said cylinders, and piston rods for said cylinders having their upper ends pivotally connected to the outer ends of said lever arms.

15. In the industrial truck set forth in claim 7, the means pivotally connecting intermediate portions of the arms with the intermediate guiding and supporting members comprising pusher arms pivotally connected at their rear ends to the first mentioned arms and pivotally connected at their front ends to lugs secured to the said intermediate guiding and supporting members.

16. In an industrial truck having a frame, a mast and a carriage supported for vertical movements by and along said mast, a load-pushing member supported by and movable with said carriage and means for reciprocating the same forwardly and rearwardly with respect to said carriage, said means comprising arms and means for rotatably supporting the same from opposite side portions of the said carriage, the said arms extending downwardly and normally rearwardly from their pivotal supports, pusher bars pivotally connected at their rear ends to the lower portions of said arms and extending forwardly therefrom, pivotal connections between the front ends of said bars and the respective side portions of the load pushing member, supporting members connected to opposite side portions of said load pushing member and movable therewith, means mounted on the carriage and slidably restraining the said supporting members against vertical movement during the movements of the load pushing member toward and from the carriage, power operated means also supported by and movable with the carriage, and connections between said power operated means and the said arms for simultaneously rocking the same in the same direction about their respective pivotal supports.

DWIGHT M. PALM.

REFERENCES CITED

The following references are of record in the file of this patent:

UNITED STATES PATENTS

| Number | Name | Date |
| --- | --- | --- |
| 704,740 | Foglesong | July 15, 1902 |
| 1,589,727 | Travell | June 22, 1926 |
| 1,669,688 | Armstrong | May 15, 1928 |
| 2,311,523 | Cope et al. | Feb. 16, 1943 |
| 2,326,338 | Drott et al. | Aug. 10, 1943 |
| 2,371,661 | Wilms | Mar. 20, 1945 |
| 2,388,458 | Alfonte | Nov. 6, 1945 |
| 2,397,046 | Richey | May 19, 1946 |